United States Patent
Abe et al.

(10) Patent No.: US 9,866,439 B2
(45) Date of Patent: Jan. 9, 2018

(54) COMMUNICATIONS SYSTEM, MANAGEMENT APPARATUS, AND COMMUNICATION SETTING METHOD

(71) Applicant: FUJITSU LIMITED, Kawasaki-shi, Kanagawa (JP)

(72) Inventors: Tomoaki Abe, Nagoya (JP); Takeshi Umezuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 417 days.

(21) Appl. No.: 14/607,119

(22) Filed: Jan. 28, 2015

(65) Prior Publication Data

US 2015/0244575 A1 Aug. 27, 2015

(30) Foreign Application Priority Data

Feb. 26, 2014 (JP) .................. 2014-035206

(51) Int. Cl.
*H04L 12/24* (2006.01)

(52) U.S. Cl.
CPC ...... *H04L 41/0846* (2013.01); *H04L 41/0806* (2013.01)

(58) Field of Classification Search
CPC .................................. H04L 41/0846
USPC ....................................... 709/217
See application file for complete search history.

(56) References Cited

U.S. PATENT DOCUMENTS

| 2007/0189295 A1* | 8/2007 | Hamamoto ....... H04L 29/12462 370/392 |
| 2010/0100611 A1 | 4/2010 | Hatasaki et al. |
| 2012/0072895 A1* | 3/2012 | Koyama .................. G06F 8/65 717/168 |
| 2012/0179776 A1 | 7/2012 | Umezuki |

FOREIGN PATENT DOCUMENTS

| JP | 2010-97402 | 4/2010 |
| JP | 2012-147218 | 8/2012 |

* cited by examiner

*Primary Examiner* — David Lazaro
*Assistant Examiner* — Zia Khurshid
(74) *Attorney, Agent, or Firm* — Fujitsu Patent Center

(57) ABSTRACT

A first setting information notification unit notifies a management apparatus via a relay apparatus of first setting information. A setting information generation unit generates third setting information from the first setting information and second setting information. For example, the setting information generation unit generates the third setting information by complementing the first setting information with the second setting information that is preliminarily stored in a setting information storage unit. A communication confirmation unit confirms communication based on the third setting information between a first communication apparatus and a second communication apparatus. A second setting information notification unit notifies the relay apparatus, the first communication apparatus, and the second communication apparatus of the third setting information.

10 Claims, 20 Drawing Sheets

| TLV type/Length | 0x99/9 |
|---|---|
| Config ID | 100 |
| Local Address | aa.aa.aa.aa.aa.aa.aa.aa |
| Connect Address | Auto |
| [Config] I/O protocol | FC |
| [Config] Port Channel | Auto |
| [Config] Port Speed | Auto |
| [Config] Switch Port | Auto |
| [Config] VLAN ID | Auto |
| [Config] MTU | Auto |
| [Config] Target Address | dd.dd.dd.dd.dd.dd.dd.dd |

FIG. 8

212 Config Profile TLV

| TLV type/Length | 0x99/9 |
|---|---|
| Config ID | 200 |
| Local Address | iqn.cccc.cc.cc |
| Connect Address | Auto |
| [Config] I/O protocol | iSCSI |
| [Config] Port Channel | No use |
| [Config] Port Speed | Auto |
| [Config] Switch Port | Auto |
| [Config] VLAN ID | Auto |
| [Config] MTU | Auto |
| [Config] Target Address | iqn.ffff.ff.ff |

FIG. 9

214 Config Profile TLV

| | |
|---|---|
| TLV type/Length | 0x99/9 |
| Config ID | Auto |
| Local Address | bb.bb.bb.bb.bb.bb.bb.bb |
| Connect Address | Auto |
| [Config] I/O protocol | FCoE |
| [Config] Port Channel | 5 |
| [Config] Port Speed | 10G |
| [Config] Switch Port | Access |
| [Config] VLAN ID | 1002 |
| [Config] MTU | 2500 |
| [Config] Target Address | ee.ee.ee.ee.ee.ee.ee.ee |

FIG. 12

|  | TLV (PROVISIONAL VERSION) | EXISTING PARAMETERS | TLV (FINAL VERSION) |
|---|---|---|---|
| Config ID | 1000 (New ID) | 200 | 1000 |
| [Config] Port Channel | Auto | No Use | No Use |
| [Config] Port Speed | 40G | 10G | 40G |
| [Config] Switch Port | Access | Trunk | Trunk |
| [Config] VLAN ID | 30 | 31 | 30,31 |
| [Config] MTU | 1500 | 9018 | 9018 |
| [Config] Target Address | ff.ff.ff.ff.ff.ff.ff.ff | ff.ff.ff.ff.ff.ff.ff.ff | ff.ff.ff.ff.ff.ff.ff.ff |

FIG. 13

|  | TLV (PROVISIONAL VERSION) | EXISTING PARAMETERS | TLV (FINAL VERSION) |
|---|---|---|---|
| Config ID | 100 | 100 | 100 |
| [Config] Port Channel | Auto | 5 | 5 |
| [Config] Port Speed | Auto | 10G | 10G |
| [Config] Switch Port | Auto | Access | Access |
| [Config] VLAN ID | Auto | 21 | 21 |
| [Config] MTU | Auto | 9018 | 9018 |

# COMMUNICATIONS SYSTEM, MANAGEMENT APPARATUS, AND COMMUNICATION SETTING METHOD

CROSS-REFERENCE TO RELATED APPLICATION

This application is based upon and claims the benefit of priority of the prior Japanese Patent Application No. 2014-035206, filed on Feb. 26, 2014, the entire contents of which are incorporated herein by reference.

FIELD

The embodiments discussed herein are related to communication systems, management apparatuses, and communication setting methods.

BACKGROUND

For example, there is known a communication system which includes a server, a storage apparatus, and the like and to which a plurality of terminal apparatuses is connected. In constructing such a communication system or in changing the configuration of the communication system, a wire connection work and a setting work by an administrator are performed.

Japanese Laid-open Patent Publication No. 2010-97402
Japanese Laid-open Patent Publication No. 2012-147218

The wire connection work and setting work by an administrator are supposed to be manually performed by the administrator, and once the administrator makes an error in setting, terminal apparatuses are unable to communicate with each other. The administrator may need to check the whole setting once an error occurs in the setting, and thus the time and effort for an administrator to spend on the setting work may become huge.

For example, in a storage system, the setting differs with communications protocols and the setting work is complicated. There are many setting items, such as the access destination of a server, the port of a server, the port of a switch for relaying between a server and a storage apparatus, the access control of a switch, the port of a storage apparatus, and the access control of a storage apparatus. On the other hand, a certain scale of storage system may have a switch with 100 ports. In a communication system having such a switch, an administrator may manually set as much as 1000 commands when the setting per port needs ten commands.

SUMMARY

According to an aspect, there is provided a communication system including: a first communication apparatus; a second communication apparatus; a relay apparatus which relays communication between the first communication apparatus and the second communication apparatus; and a management apparatus which manages a setting of the relay apparatus, wherein the first communication apparatus includes: a first setting information notification unit that notifies the management apparatus via the relay apparatus of first setting information including a communication setting of the first communication apparatus; and a setting update unit that updates the communication setting with third setting information received from the management apparatus, wherein the management apparatus includes: a setting information generation unit that generates the third setting information from the first setting information and second setting information that is preliminarily stored in a setting information storage unit; a communication confirmation unit that confirms communication based on the third setting information between the first communication apparatus and the second communication apparatus; and a second setting information notification unit that notifies the relay apparatus, the first communication apparatus via the relay apparatus, and the second communication apparatus via the relay apparatus of the third setting information, after confirmation of the communication, wherein the relay apparatus includes a setting update unit that updates the communication setting with the third setting information received from the management apparatus, and wherein the second communication apparatus includes a setting update unit that updates the communication setting with the third setting information received from the management apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example (Part 2) of the Config Profile TLV of the second embodiment;

FIG. 9 illustrates an example (Part 3) of the Config Profile TLV of the second embodiment;

FIG. 12 illustrates an example of merging Config Profile TLV's of the second embodiment;

FIG. 13 illustrates an example of merging Config Profile TLV's of the second embodiment;

DESCRIPTION OF EMBODIMENTS

Figure 1:
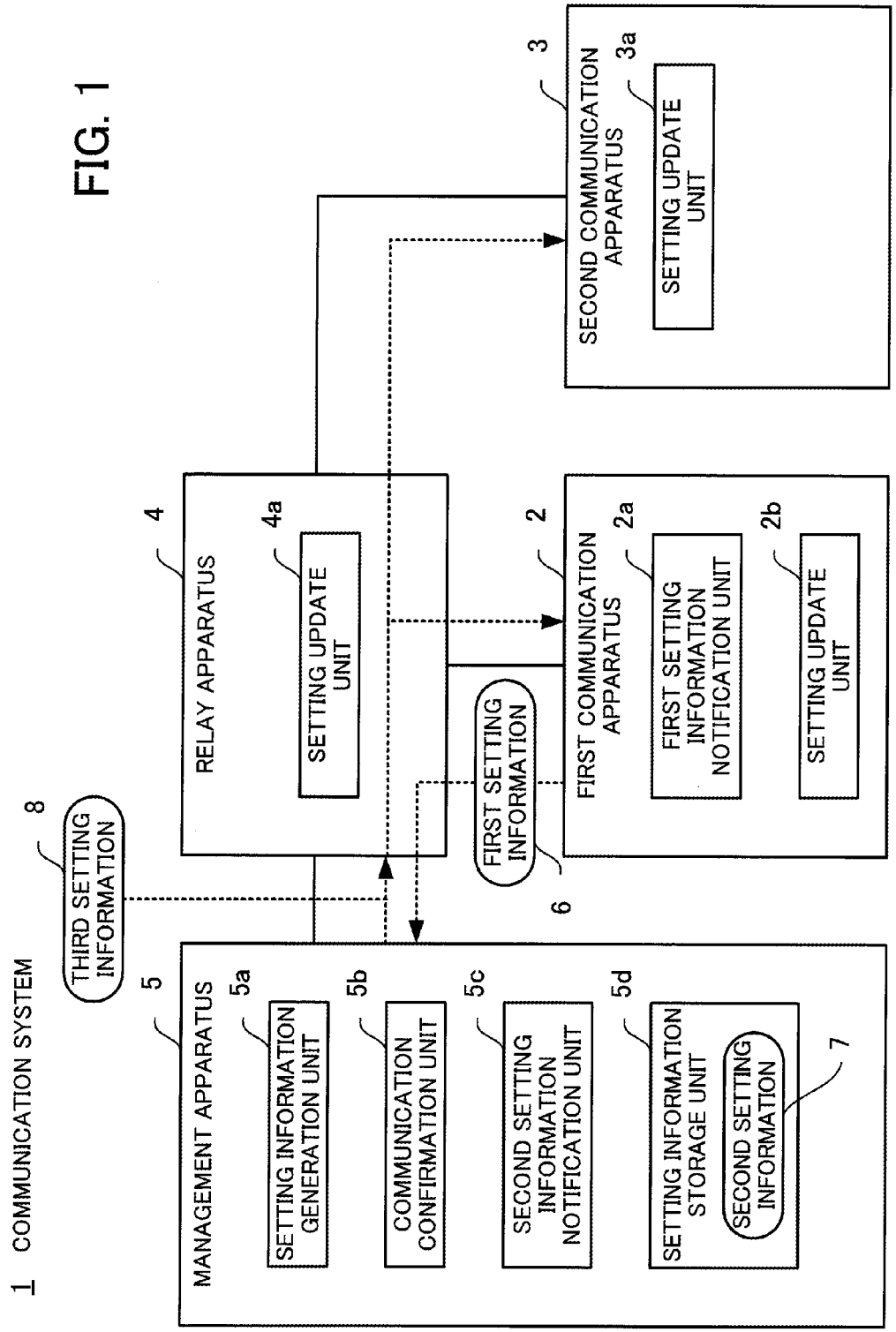
FIG. 1 illustrates an example of the configuration of a communication system of a first embodiment.

Several embodiments will be described below with reference to the accompanying drawings, wherein like reference numerals refer to like elements throughout.

First Embodiment

First, a communication system of a first embodiment is described using FIG. 1. FIG. 1 illustrates an example of the configuration of the communication system of the first embodiment.

A communication system 1 includes a first communication apparatus 2, a second communication apparatus 3, a relay apparatus 4, and a management apparatus 5. The first communication apparatus 2 and second communication apparatus 3 may communicate with each other via the relay apparatus 4 that relays communication between the first communication apparatus 2 and the second communication apparatus 3. The management apparatus 5 manages the setting of each of the first communication apparatus 2, second communication apparatus 3, and relay apparatus 4.

The communication system 1 is a storage system, where the first communication apparatus 2 or the second communication apparatus 3 is a business server or a storage apparatus, the relay apparatus 4 is a switch, and the management apparatus 5 is a management server, for example.

The first communication apparatus 2 is the apparatus serving as a starting point of changing the setting. The first communication apparatus 2 includes a first setting information notification unit 2a and a setting update unit 2b. The first setting information notification unit 2a notifies the management apparatus 5 via the relay apparatus 4 of first setting information 6 including the communication setting of the first communication apparatus 2. The notification of the first setting information 6 to the management apparatus 5 is the starting point of changing the setting. The first setting information 6 is provisional setting information obtained by profiling the connection requirements of the first communication apparatus 2. The provisional setting information is not the information whose content has not yet been determined to be reflected on the setting, but the information where a specific setting content does not always need to be included in all the setting items, respectively. The first setting information 6 is a data set of a TLV (Type/Length/Value) structure obtained by compiling the communication settings, for example.

The setting update unit 2b updates the communication setting of the first communication apparatus 2 with third setting information 8 received from the management apparatus 5. The third setting information 8 is the setting information for which the communication between the first communication apparatus 2 and the second communication apparatus 3 is confirmed.

The management apparatus 5 includes a setting information generation unit 5a, a communication confirmation unit 5b, a second setting information notification unit 5c, and a setting information storage unit 5d. The setting information generation unit 5a generates the third setting information 8 from the first setting information 6 and second setting information 7. For example, the setting information generation unit 5a generates the third setting information 8 by complementing the first setting information 6 with the second setting information 7.

Note that the management apparatus 5 (corresponding to an acquisition unit) acquires the first setting information 6 through notification from the first setting information notification unit 2a.

The second setting information 7 is the setting information that is preliminarily stored in the setting information storage unit 5d. The second setting information 7 is the setting information capable of complementing the first setting information 6 that is provisional setting information, and for example is the setting information already set in another communication apparatus. The setting information storage unit 5d may store the second setting information 7. The setting information storage unit 5d is, for example, a RAM (Random Access Memory), an HDD (Hard Disk Drive), or the like of the management apparatus 5, but may be a storage device of an external device as long as the management apparatus 5 may access thereto.

The communication confirmation unit 5b confirms the communication based on the third setting information 8 between the first communication apparatus 2 and the second communication apparatus 3. For example, the confirmation of the communication performed by the communication confirmation unit 5b includes confirming the communication between the first communication apparatus 2 and the second communication apparatus 3 and confirming the access control of each of the first communication apparatus 2 and the second communication apparatus 3. Note that the communication confirmation performed by the communication confirmation unit 5b is performed as follows: the management apparatus 5 instructs the relay apparatus 4 to confirm the communication and confirms the response of a confirmation result from the relay apparatus 4 to the management apparatus 5, but may be performed proactively by the management apparatus 5.

The second setting information notification unit 5c notifies the relay apparatus 4, the first communication apparatus 2, and the second communication apparatus 3 of the third setting information 8 after the communication confirmation by the communication confirmation unit 5b. Note that the second setting information notification unit 5c notifies the first communication apparatus 2 and second communication apparatus 3 via the relay apparatus 4 of the third setting information 8.

The relay apparatus 4 includes a setting update unit 4a. The setting update unit 4a updates the communication setting of the relay apparatus 4 with the third setting information 8 received from the management apparatus 5. The second communication apparatus 3 includes a setting update unit 3a. The setting update unit 3a updates the communication setting of the second communication apparatus 3 with the third setting information 8 received from the management apparatus 5.

In this manner, the communication system 1 may use the notification of the first setting information 6 that is the provisional setting information by the first communication apparatus 2, as the starting point of changing the setting, and therefore may reduce the burden of inputting the setting on an administrator in changing the setting of the communication system 1. Moreover, the communication system 1 may eliminate an error in inputting the setting made by an administrator, because the communication system 1 performs communication confirmation among the first communication apparatus 2, the second communication apparatus 3, and the relay apparatus 4, based on the third setting information 8. Because an error in inputting the setting is eliminated, the communication system 1 may reduce the cost of investigating the cause of the error in inputting the setting made by an administrator. The cost here includes the working time, man hour, and the like associated with the setting change.

Accordingly, in constructing the communication system 1 or in changing the configuration of the communication system 1, the communication system 1 may reduce the cost of constructing a communicable state.

Second Embodiment

Figure 2:
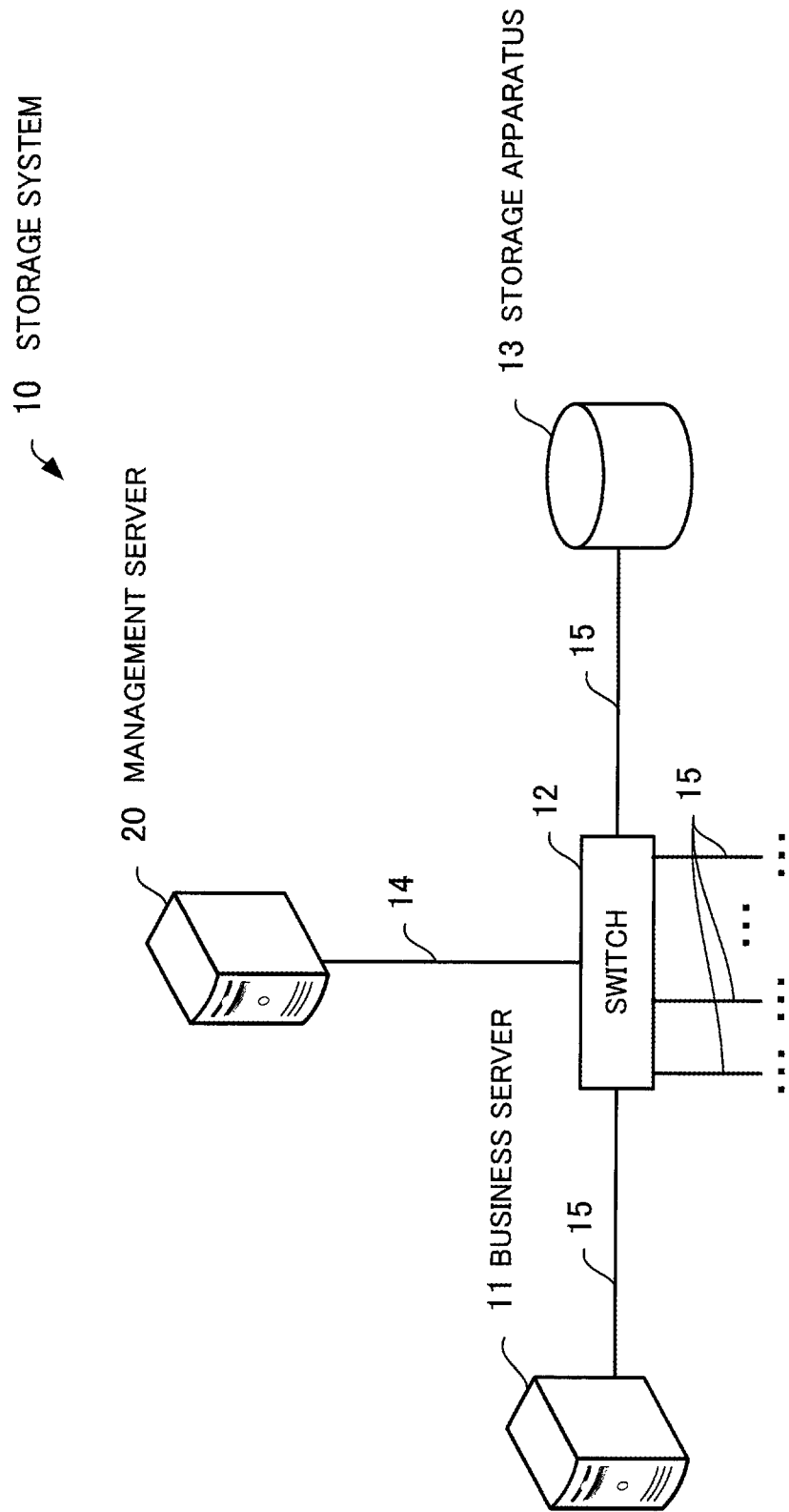
FIG. 2 illustrates an example of the connection configuration of a storage system of a second embodiment.

Next, the connection configuration of a storage system of a second embodiment is described using FIG. 2. FIG. 2 illustrates an example of the connection configuration of the storage system of the second embodiment.

A storage system 10 makes a storage area prepared by a storage apparatus 13, available in a business server 11. The storage system 10 includes the business server 11, a switch 12, the storage apparatus 13, and a management server 20. Note that the storage system 10 is one form of the communication system 1 illustrated in the first embodiment. Here, the business server 11 corresponds to the first communication apparatus 2, the storage apparatus 13 to the second communication apparatus 3, the switch 12 to the relay apparatus 4, and the management server 20 to the management apparatus 5.

The storage system 10 connects the business server 11, the switch 12, and the storage apparatus 13 via a business network 15, and connects the switch 12 and the management server 20 via a management network 14. The switch 12 includes a plurality of ports (e.g., 100 ports), and allows a plurality of non-illustrated business servers, storage apparatuses, and switches, in addition to the business server 11 and storage apparatus 13, to be connected thereto.

Figure 3:
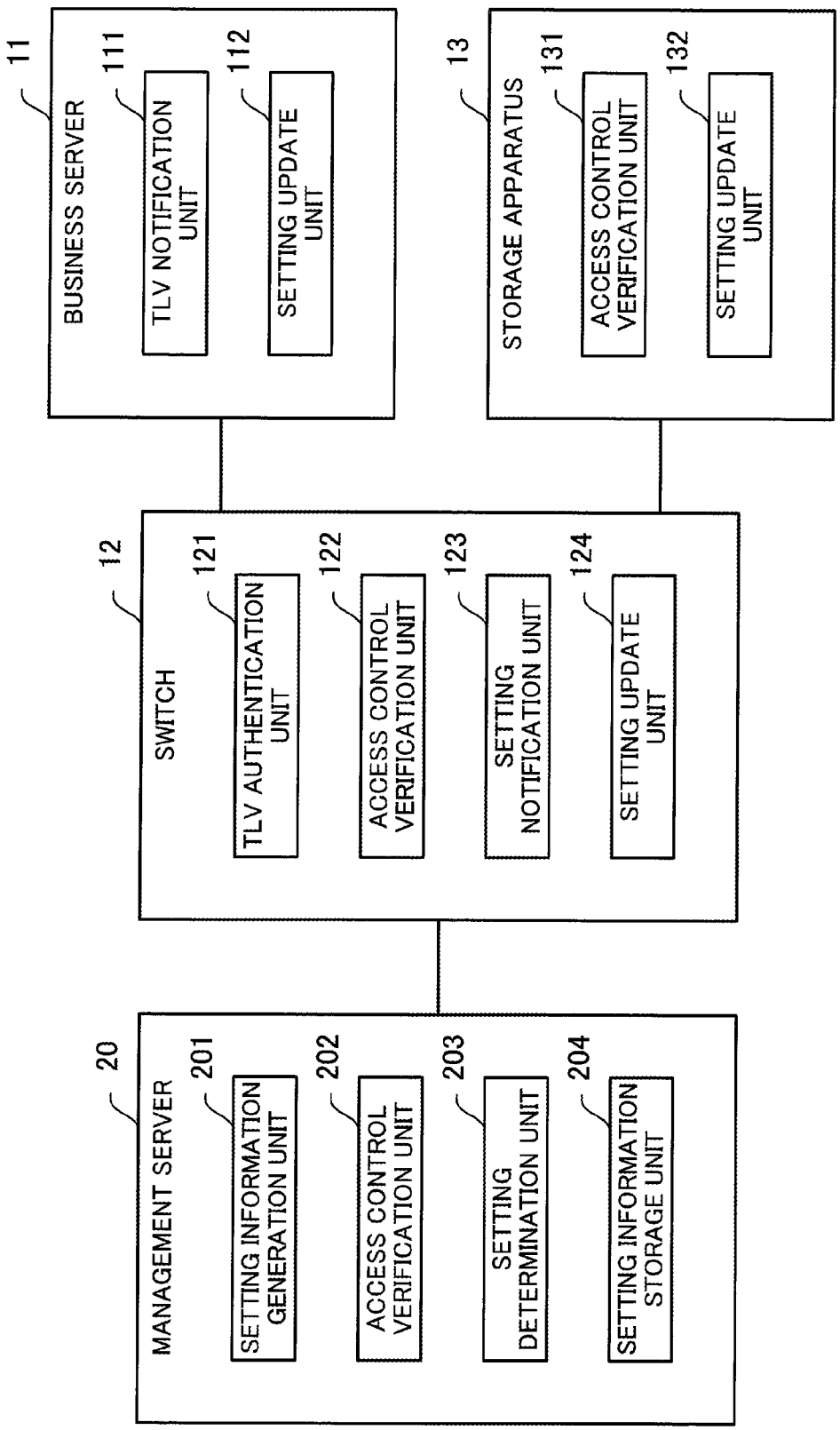
FIG. 3 illustrates an example of the functional configuration of the storage system of the second embodiment.

Next, the functional configuration of the storage system of the second embodiment is described using FIG. 3. FIG. 3 illustrates an example of the functional configuration of the storage system of the second embodiment.

The business server 11 includes a TLV notification unit 111 and a setting update unit 112. The switch 12 includes a TLV authentication unit 121, an access control verification unit 122, a setting notification unit 123, and a setting update unit 124. The storage apparatus 13 includes an access control verification unit 131 and a setting update unit 132. The management server 20 includes a setting information generation unit 201, an access control verification unit 202, a setting determination unit 203, and a setting information storage unit 204.

Figure 4:
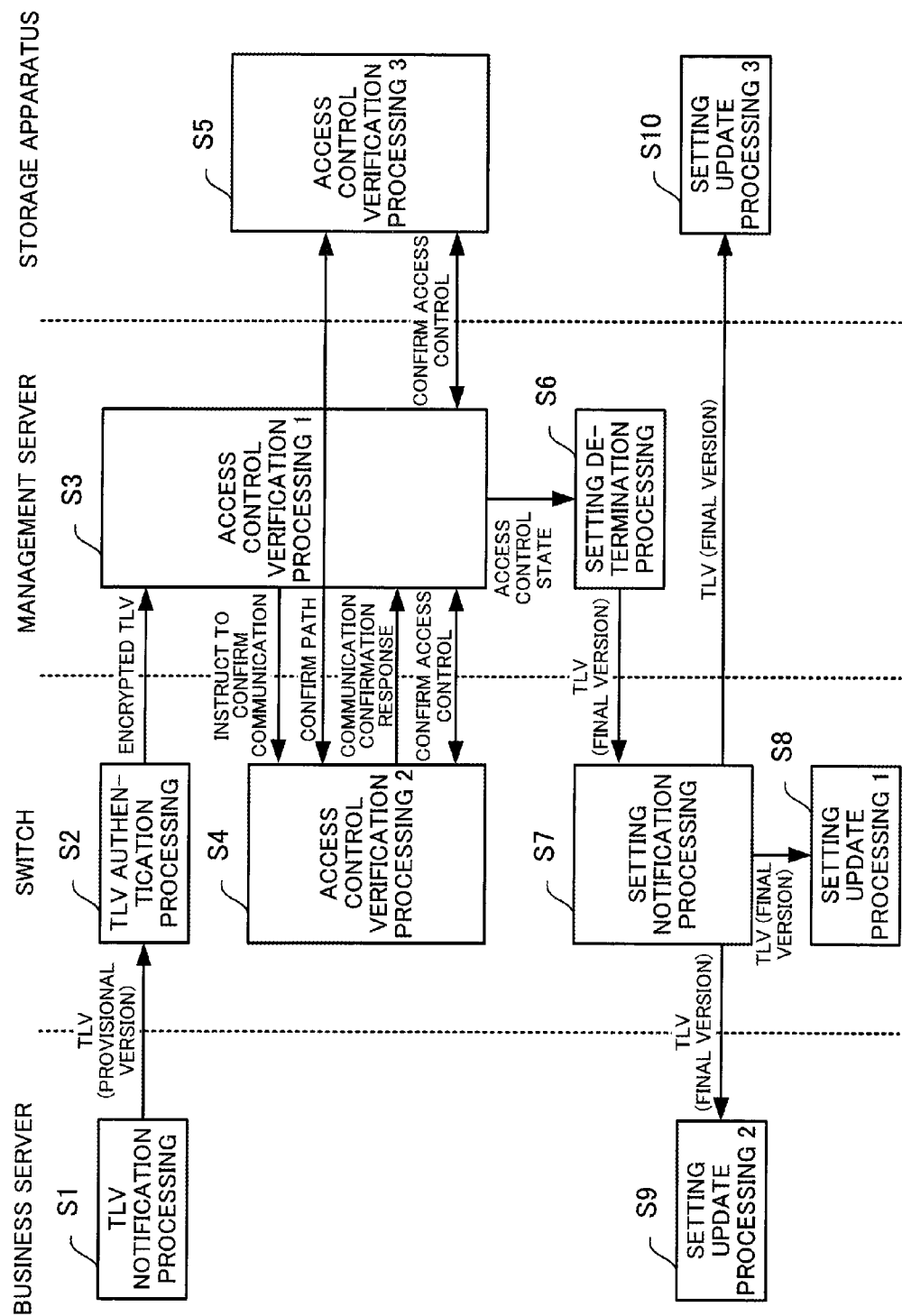
FIG. 4 illustrates an example of the setting sequence of the second embodiment.

The operation of each part illustrated in FIG. 3 is described using FIG. 4. FIG. 4 illustrates an example of the setting sequence of the second embodiment.

The business server 11 serving as the starting point of changing the setting executes TLV notification processing by means of the TLV notification unit 111 (step S1). The TLV notification unit 111 notifies the switch 12 of Config Profile TLV (hereinafter, TLV (provisional version)) that serves as a provisional version, in the TLV notification processing. The TLV (provisional version) corresponds to the first setting information 6 of the first embodiment.

The switch 12, upon receipt of the TLV (provisional version) from the business server 11, executes TLV authentication processing by means of the TLV authentication unit 121 (step S2). The TLV authentication unit 121 generates encrypted TLV by encrypting the TLV (provisional version) in the TLV authentication processing, and notifies the management server 20 of the encrypted TLV.

The management server 20, upon receipt of the encrypted TLV from the switch 12, executes access control verification processing 1. The access control verification processing 1 is executed by the setting information generation unit 201 and the access control verification unit 202 (step S3). The setting information generation unit 201 decrypts the encrypted TLV and generates Config Profile TLV (hereinafter, TLV (final edition)) that serves as the final version, in the access control verification processing 1. The setting information generation unit 201 decrypts the encrypted TLV, and generates TLV (final version) by complementing the decrypted TLV with the Config Profile TLV stored in the setting information storage unit 204. The Config Profile TLV stored in the setting information storage unit 204 corresponds to the second setting information 7 of the first embodiment, while the TLV (final version) corresponds to the third setting information 8 of the first embodiment. The Config Profile TLV is managed by the management server 20 using a Config ID management DB (DataBase) that is stored in the setting information storage unit 204.

The access control verification unit 202 confirms the communication between the business server 11 and the storage apparatus 13 and the access control of each of the business server 11 and the storage apparatus 13, in accordance with the TLV (final version), in the access control verification processing 1. The access control verification unit 202 instructs the switch 12 to confirm the communication between the business server 11 and the storage apparatus 13 and receives confirmation response from the switch 12, thereby confirming the communication between the business server 11 and the storage apparatus 13. Moreover, the access control verification unit 202 confirms the access control of each of the business server 11 and the storage apparatus 13.

The switch 12, upon receipt of the communication confirmation instruction from the management server 20, executes access control verification processing 2 by means of the access control verification unit 122 (step S4). The access control verification unit 122 requests to confirm the path from the switch 12 to the storage apparatus 13 and receives a response from the storage apparatus 13, thereby confirming the communication between the business server and the storage apparatus 13. The access control verification unit 122 returns a confirmation result to the management server 20. Moreover, the access control verification unit 122 returns the content of access control of the switch 12 in response to the access control confirmation from the management server 20.

The storage apparatus 13, upon receipt of the request for path confirmation from the switch 12, executes access control verification processing 3 by means of the access control verification unit 131 (step S5).

The management server 20 executes setting determination processing by means of the setting determination unit 203 after confirmation of the communication between the business server 11 and the storage apparatus 13 and the access control of each of the business server 11 and the storage apparatus 13, in accordance with the TLV (final version) (step S6). The setting determination unit 203 confirms the matching between the access control of the business server 11 and the access control of the storage apparatus 13, in accordance with the confirmed access control state. The setting determination unit 203 notifies the switch 12 of the TLV (final version) when the access control of the business server 11 matches the access control of the storage apparatus 13, i.e., when the business server 11 and the storage apparatus 13 are able to communicate with each other. Moreover, the setting determination unit 203 adds the TLV (final version) as the Config Profile TLV stored in the setting information storage unit 204. That is, the setting determination unit 203 serves as an additional storage unit configured to additionally store the Config Profile TLV in the setting information storage unit 204.

The switch 12, upon receipt of the TLV (final version) from the management server 20, executes setting notification processing by means of the setting notification unit 123 (step S7). The setting notification unit 123 notifies the business server 11 and the storage apparatus 13 of the TLV (final version).

The switch 12, after notifying the business server 11 and the storage apparatus 13 of the TLV (final version), executes setting update processing by means of the setting update unit 124 (step S8). The setting update unit 124 changes the setting of the switch 12 in accordance with the TLV (final version).

The business server 11, upon receipt of the TLV (final version) from the switch 12, executes setting update processing 2 by means of the setting update unit 112 (step S9). The setting update unit 112 changes the setting of the business server 11 in accordance with the TLV (final version).

The storage apparatus 13, upon receipt of the TLV (final version) from the switch 12, executes setting update processing 3 by means of the setting update unit 132 (step S10). The setting update unit 132 changes the setting of the storage apparatus 13 in accordance with the TLV (final version).

In this manner, the storage system 10 may use the notification of the TLV (provisional version) by the business server 11, as the starting point of changing the setting, and therefore may reduce the burden of inputting the setting on an administrator in changing the setting of the storage system 10. Moreover, the storage system 10 may eliminate an error in inputting the setting made by an administrator, because the storage system 10 performs communication confirmation among the business server 11, the storage apparatus 13, and the switch 12, based on the TLV (final version). Because an error in inputting the setting is eliminated, the storage system 10 may reduce the cost of investigating the cause of the error in inputting the setting made by an administrator.

Accordingly, the storage system 10 may reduce the cost of constructing a communicable state, in constructing the storage system 10 or in changing the configuration of the storage system 10.

Figure 5:
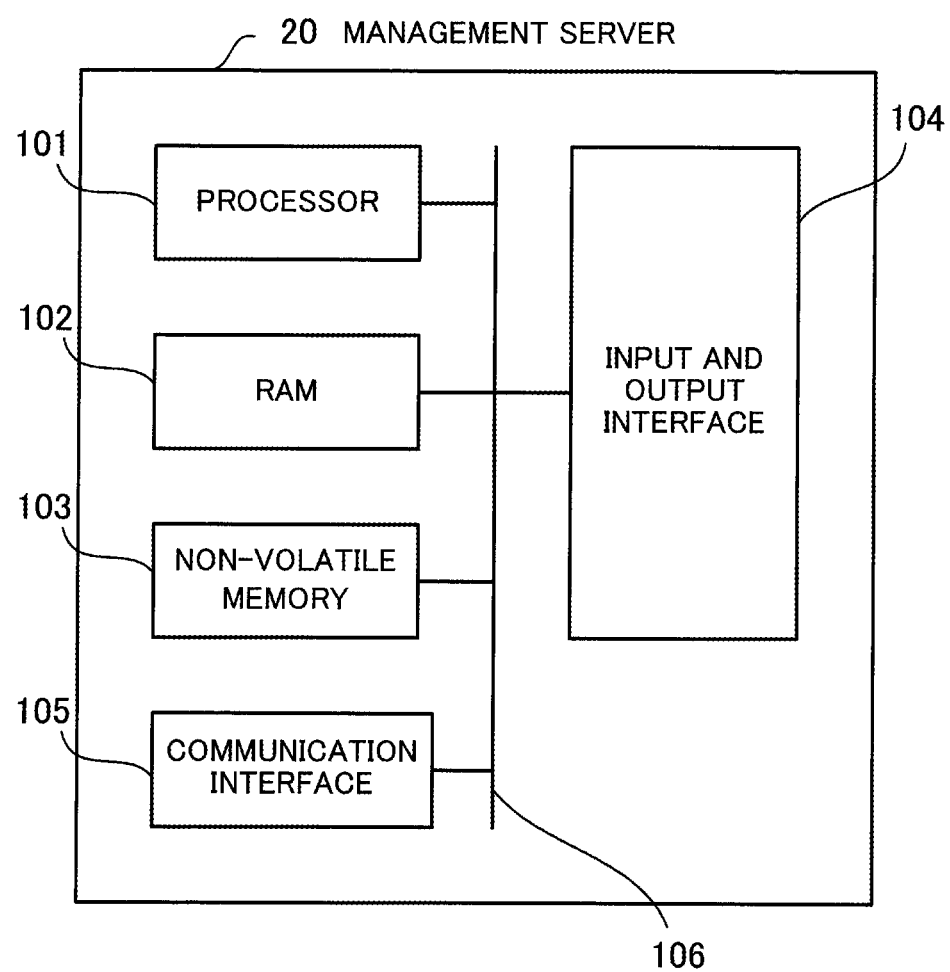
FIG. 5 illustrates an example of the hardware configuration of a management server of the second embodiment.

Next, the hardware configuration of the management server 20 is described using FIG. 5. FIG. 5 illustrates an example of the hardware configuration of the management server of the second embodiment.

The whole apparatus of the management server 20 is controlled by a processor 101. A RAM 102 and a plurality of peripheral devices are connected to the processor 101 via a bus 106. The processor 101 may be a multiprocessor. The processor 101 is, for example, a CPU (Central Processing Unit), an MPU (Micro Processing Unit), a DSP (Digital Signal Processor), an ASIC (Application Specific Integrated Circuit), or a PLD (Programmable Logic Device). Moreover, the processor 101 may be a combination of two or more elements of the CPU, MPU, DSP, ASIC, and PLD.

The RAM 102 is used as the main storage device of the management server 20. At least a part of the program or firmware of an operating system and application programs executed by the processor 101 is temporarily stored in the RAM 102. Various types of data needed for processing by the processor 101 are stored in the RAM 102. Moreover, the RAM 102 may include a cache memory separate from a memory that is used for storing various types of data.

The peripheral devices connected to the bus 106 include a nonvolatile memory 103, an input and output interface 104, and a communication interface 105.

The nonvolatile memory 103 retains the memory contents even when the power supply of the management server 20 is shut off. The nonvolatile memory 103 is, for example, a semiconductor storage device, such as an EEPROM (Electrically Erasable Programmable Read-Only Memory) and a flash memory, an HDD, or the like. Moreover, the nonvolatile memory 103 is used as auxiliary storage device of the management server 20. The program or firmware of an operating system, application programs, and various types of data are stored in the nonvolatile memory 103.

The input and output interface 104 connects to non-illustrated input and output apparatuses and performs input and output processing.

The communication interface 105 transmits and receives data to and from the switch 12 via the management network 14.

With the hardware configuration as described above, the processing functions of the management server 20 of the second embodiment may be realized. Note that, the business server 11, the switch 12, the storage apparatus 13, as well as the first communication apparatus 2, second communication apparatus 3, relay apparatus 4, and management apparatus 5 illustrated in the first embodiment may be also realized with the same hardware as the management server 20 illustrated in FIG. 5.

The management server 20 realizes the processing functions of the second embodiment by executing programs recorded on a computer readable recording medium, for example. The programs describing the processing contents executed by the management server may be recorded on various recording media. For example, the programs executed by the management server may be stored in the nonvolatile memory 103. The processor 101 loads at least a part of the programs inside the nonvolatile memory 103 into the RAM 102 and executes the programs. Moreover, the programs executed by the management server 20 may be also recorded on a portable storage medium, such as a non-illustrated optical disc, memory device, or memory card. The examples of the optical disc include a DVD (Digital Versatile Disc), a DVD-RAM, a CD-ROM (Compact Disc Read Only Memory), and a CD-R (Recordable)/RW (ReWritable). The memory device is a recording medium having a function to communicate with the input and output interface 104 or with a non-illustrated device connection interface. For example, the memory device may write data to a memory card or read data from a memory card using a memory reader and writer. The memory card is a card-type recording medium.

A program stored on the portable storage medium is installed into the nonvolatile memory 103 under the control of the processor 101, for example, and then becomes executable. Moreover, the processor 101 may also read a program directly from the portable storage medium and execute the same.

Note that, the business server 11, the switch 12, and the storage apparatus 13 may also realize the processing functions of the second embodiment as with the management server 20. Moreover, the first communication apparatus 2, second communication apparatus 3, relay apparatus 4, and management apparatus 5 illustrated in the first embodiment may also realize the processing functions of the first embodiment as with the management server 20.

Figure 6:
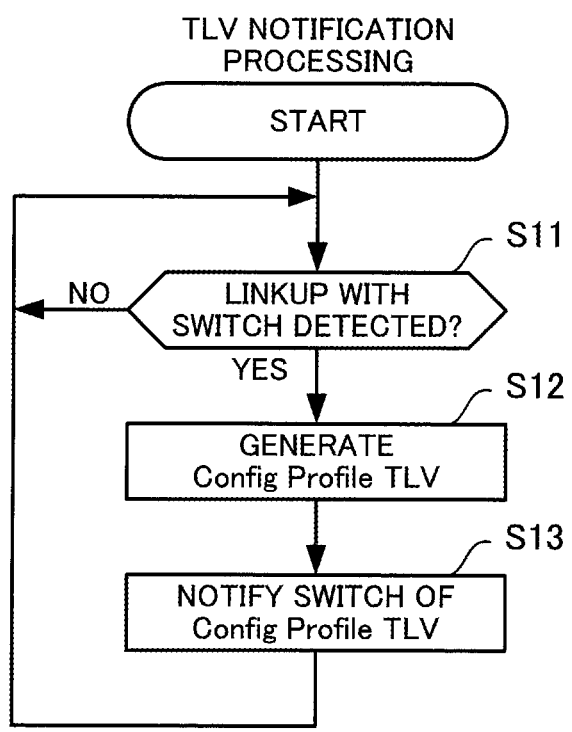
FIG. 6 illustrates a flowchart of TLV notification processing of the second embodiment.

Next, the TLV notification processing of the second embodiment is described using FIG. 6. FIG. 6 illustrates a flowchart of the TLV notification processing of the second embodiment.

The TLV notification processing is processing for notifying the switch 12 of the TLV (provisional version) by the TLV notification unit 111.

(Step S11) The TLV notification unit 111 detects linkup with the switch 12 by monitoring the communication interface. The TLV notification unit 111 proceeds to step S12 when having detected the linkup with the switch 12, and wait for the detection of the linkup with the switch 12 when having not detected the linkup with the switch 12.

(Step S12) The TLV notification unit 111 generates a Config Profile TLV (TLV (provisional version)) serving as a provisional version. Note that, because the setting contents of the TLV (provisional version) will be updated by overwriting or complement, a specific setting content does not always need to be determined in all the setting items.

(Step S13) The TLV notification unit 111 notifies the switch 12 of the generated TLV (provisional version), and returns to step S11.

Figure 7:
FIG. 7 illustrates an example (Part 1) of Config Profile TLV of the second embodiment.

Here, the TLV (provisional version) is described using FIG. 7 to FIG. 9. First, an example (Part 1) of the Config Profile TLV of the second embodiment is described using FIG. 7. FIG. 7 illustrates the example (Part 1) of the Config Profile TLV of the second embodiment.

Config Profile TLV 210 (hereinafter, TLV 210) is a data set of the TLV structure obtained by compiling the communication settings. The TLV 210 includes an item "TLV type/Length" and an item "Config ID". The item "TLV type/Length" is the setting item of information indicative of the TLV structure. The item "Config ID" is the setting item of information for identifying the communication setting already set in the business server (not illustrated) in operation. For example, the item "Config ID" may have a value "Auto" or a value ranging from "1" to "9999" as the setting content. When the item "Config ID" has the value "Auto", the numbering is entrusted to the management server 20. Here, a specific numerical value specifies the same setting as the setting of the already set business server having the same numerical value.

Furthermore, the TLV 210 includes an item "Local Address". The item "Local Address" is the setting item of identification information, with which a communication source in the business network 15, i.e., a port of the business server 11 may be identified. The setting content of the item "Local Address" is, for example, WWN (World Wide Name) of a port when an I/O (Input/Output) Protocol is an FC (Fibre Channel) or an FCoE (Fibre Channel over Ethernet), or IQN (iSCSI Qualified Name) of a port when the I/O Protocol is iSCSI (Internet Small Computer System Interface).

Furthermore, the TLV 210 includes an item "Connect Address". The item "Connect Address" is the setting item of identification information, with which a connection destination of the business server 11 in the business network 15, i.e., a port of the switch 12 may be identified. The examples of the setting content of the item "Connect Address" include the WWN of a port when the I/O Protocol is FC, a MAC (Media Access Control) address of a port when the I/O Protocol is FCoE or iSCSI, and the like in addition to Auto, in which case a specific setting content is entrusted to an external apparatus.

Furthermore, the TLV 210 includes an item "(Config) I/O Protocol". The item "(Config) I/O Protocol" is the setting item of a communication protocol which the communication source in the business network 15, i.e., the business server 11 may use. The examples of the setting content of the item "(Config) I/O Protocol" include IP (Internet Protocol), iSCSI, FCoE, FC, and the like.

Furthermore, the TLV 210 includes an item "(Config) Port Channel". The item "(Config) Port Channel" is the setting item of a port number which the communication source in the business network 15, i.e., the business server 11 may use. The examples of the setting content of the item "(Config) Port Channel" include Auto, in which case a specific setting content is entrusted to an external apparatus, "No use", in which case the item "(Config) Port Channel" is not used, the specification of a specific port number ranging from 1 to 256, and the like.

Furthermore, the TLV 210 includes an item "(Config) Port Speed". The item "(Config) Port Speed" is the setting item of a port speed which the communication source in the business network 15, i.e., the business server 11 may use. The examples of the setting content of the item "(Config) Port Speed" include Auto, in which case a specific setting content is entrusted to an external apparatus, the specification of a specific port speed, such as 8/10/16/40 Gbps, and the like.

Furthermore, the TLV 210 includes an item "(Config) Switch Port". The item "(Config) Switch Port" is the setting item of the connection destination of a communication source in the business network 15, i.e., a port of the switch 12. The examples of the setting content of the item "(Config) Switch Port" include Auto, in which case a specific setting content is entrusted to an external apparatus, Access, Trunk, and the like.

Furthermore, the TLV 210 includes an item "(Config) VLAN ID". The item "(Config) VLAN ID" is the setting item of the connection destination of a communication source in the business network 15, i.e., a port of the switch 12. The examples of the setting content of the item "(Config) VLAN ID" include Auto, in which case a specific setting content is entrusted to an external apparatus, the specification of a specific identification number, such as a number ranging from 1 to 4094, and the like.

Furthermore, the TLV 210 includes an item "(Config) MTU". The item "(Config) MTU" is the setting item of a MTU (Maximum Transmission Unit) which the communication source in the business network 15, i.e., the business server 11 may use. The examples of the setting content of the item "(Config) MTU" include Auto, in which case a specific setting content is entrusted to an external apparatus, the specification of a specific numerical value, such as 576 bytes or 9018 bytes, and the like.

Furthermore, the TLV 210 includes an item "(Config) Target Address". The item "(Config) Target Address" is the setting item of identification information, with which the communication destination of the business server 11 in the business network 15, i.e., the port of the storage apparatus 13 may be identified. The examples of the setting content of the item "(Config) Target Address" include the WWN of a port when the I/O Protocol is FC or FCoE or the IQN of a port when the I/O Protocol is iSCSI, and the like.

Note that the item including (Config) is the item, to which an appropriate value (parameter) may be easily set according to the environment of the business network 15 by an external apparatus.

In the TLV 210, the item "TLV type/Length" has the value "0x99/9", and the item "Config ID" has the value "100". The item "Config ID"=value "100" means that the same setting as the already set business server of the item "Config ID"=value "100" is specified.

The TLV 210 sets specific information to the item "(Config) I/O Protocol", the item "Local Address", and the item "(Config) Target Address", respectively. For example, the TLV 210 sets the value "FC" to the item "(Config) I/O Protocol", the value "aa.aa.aa.aa.aa.aa.aa.aa" to the item "Local Address", and the value "dd.dd.dd.dd.dd.dd.dd.dd" to the item "(Config) Target Address", respectively. Then, the TLV 210 may set the value "Auto" to the setting contents of the other setting items so as to entrust the setting of a specific value to an external apparatus.

Next, an example (Part 2) of the Config Profile TLV of the second embodiment is described using FIG. 8. FIG. 8 illustrates the example (Part 2) of the Config Profile TLV of the second embodiment.

A Config Profile TLV 212 (hereinafter, TLV 212) is a data set of the TLV structure obtained by compiling the communication settings. The TLV 212 includes the same setting items as the TLV 210.

In the TLV 212, the item "TLV type/Length" has the value "0x99/9" and the item "Config ID" has the value "200". The item "Config ID"=value "200" means that the same setting as the already set business server of the item "Config ID"=value "200" is specified.

The TLV 212 sets specific information to the item "(Config) I/O Protocol", the item "(Config) Port Channel", the item "Local Address", and the item "(Config) Target Address", respectively. For example, the TLV 212 sets the value "iSCSI" to the item "(Config) I/O Protocol" and the value "No use" to the item "(Config) Port Channel". Furthermore, the TLV 212 sets the value "iqn.cccc.cc.cc" to the item "Local Address" and the value "iqn.ffff.ff.ff" to the item "(Config) Target Address". Then, the TLV 212 may set the value "Auto" to the setting contents of the other setting items so as to entrust the setting of a specific value to an external apparatus.

Next, an example (Part 3) of the Config Profile TLV of the second embodiment is described using FIG. 9. FIG. 9 illustrates the example (Part 3) of the Config Profile TLV of the second embodiment.

Config Profile TLV 214 (hereinafter, TLV 214) is a data set of the TLV structure obtained by compiling the communication settings. The TLV 214 includes the same setting items as the TLV 210.

In the TLV 214, the item "TLV type/Length" has the value "0x99/9", and the item "Config ID" has the value "Auto". The item "Config ID"=value "Auto" means profiling a new Config.

The TLV 214 sets the setting content of the item "Connect Address" to the value "Auto" so as to entrust the setting of a specific value to an external apparatus, and sets a specific value to the other items, respectively. The TLV 214 sets the value "bb.bb.bb.bb.bb.bb.bb.bb" to the item "Local Address", the value "FCoE" to the item "(Config) I/O Protocol", and the value "5" to the item "(Config) Port Channel". The TLV 214 sets the value "10G" to the item "(Config) Port Speed", the value "Access" to the item "(Config) Switch Port", and the value "1002" to the item "(Config) VLAN ID". The TLV 214 sets the value "2500" to the item "(Config) MTU" and the value "ee.ee.ee.ee.ee.ee.ee.ee" to the item "(Config) Target Address".

These TLV 210, TLV 212, and TLV 214 are pieces of provisional setting information, for each of which a specific value does not always need to be set to all the items. Accordingly, the storage system 10 may reduce the burden on an administrator due to a setting work using the TLV 210, TLV 212, and TLV 214 which are the pieces of provisional setting information.

Figure 10:
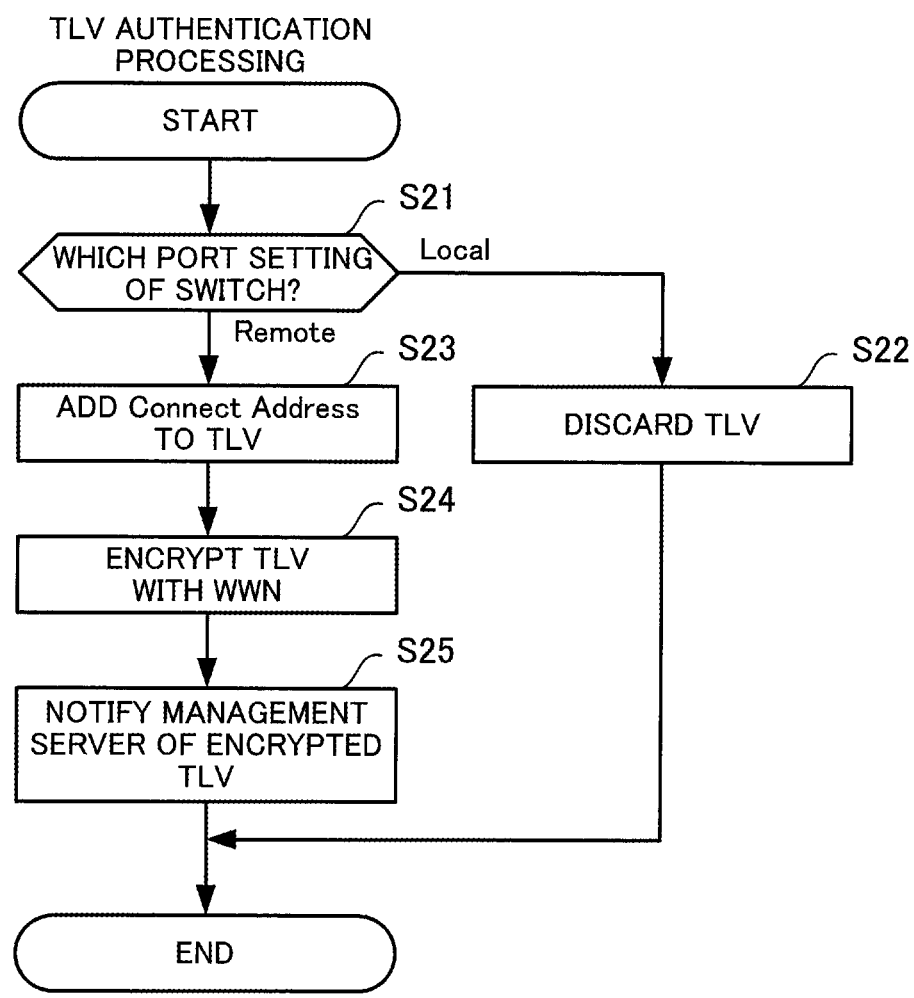
FIG. 10 illustrates a flowchart of TLV authentication processing of the second embodiment.

Next, the TLV authentication processing of the second embodiment is described using FIG. 10. FIG. 10 illustrates a flowchart of the TLV authentication processing of the second embodiment. The TLV authentication processing notifies the management server of the TLV (provisional version) by the switch 12 having received the TLV (provisional version). The TLV authentication unit 121 of the switch 12 executes the TLV authentication processing triggered by receipt of the TLV (provisional version).

(Step S21) The TLV authentication unit 121 determines whether the port setting of the switch 12 is "Local" or "Remote". The TLV authentication unit 121 proceeds to step S22 when the port setting of the switch is "Local", and proceeds to step S23 when it is "Remote".

(Step S22) The TLV authentication unit 121 discards the received TLV (provisional version) and keeps the port setting of "Local", and completes the TLV authentication processing.

(Step S23) The TLV authentication unit 121 additionally sets a specific value to the item "Connect Address" of the TLV (provisional version). Accordingly, if the TLV (provisional version) which the TLV authentication unit 121 has received from the management server 20 is defined as the first version, a TLV (provisional version) for which a specific value is additionally set to the item "Connect Address" is defined as the second version.

(Step S24) The TLV authentication unit 121 encrypts the TLV (provisional version), using the WWN of a port of the switch 12 as an encryption key.

(Step S25) The TLV authentication unit 121 notifies the management server 20 of the encrypted TLV (provisional version: encrypted TLV), and completes the TLV authentication processing.

Figure 11:
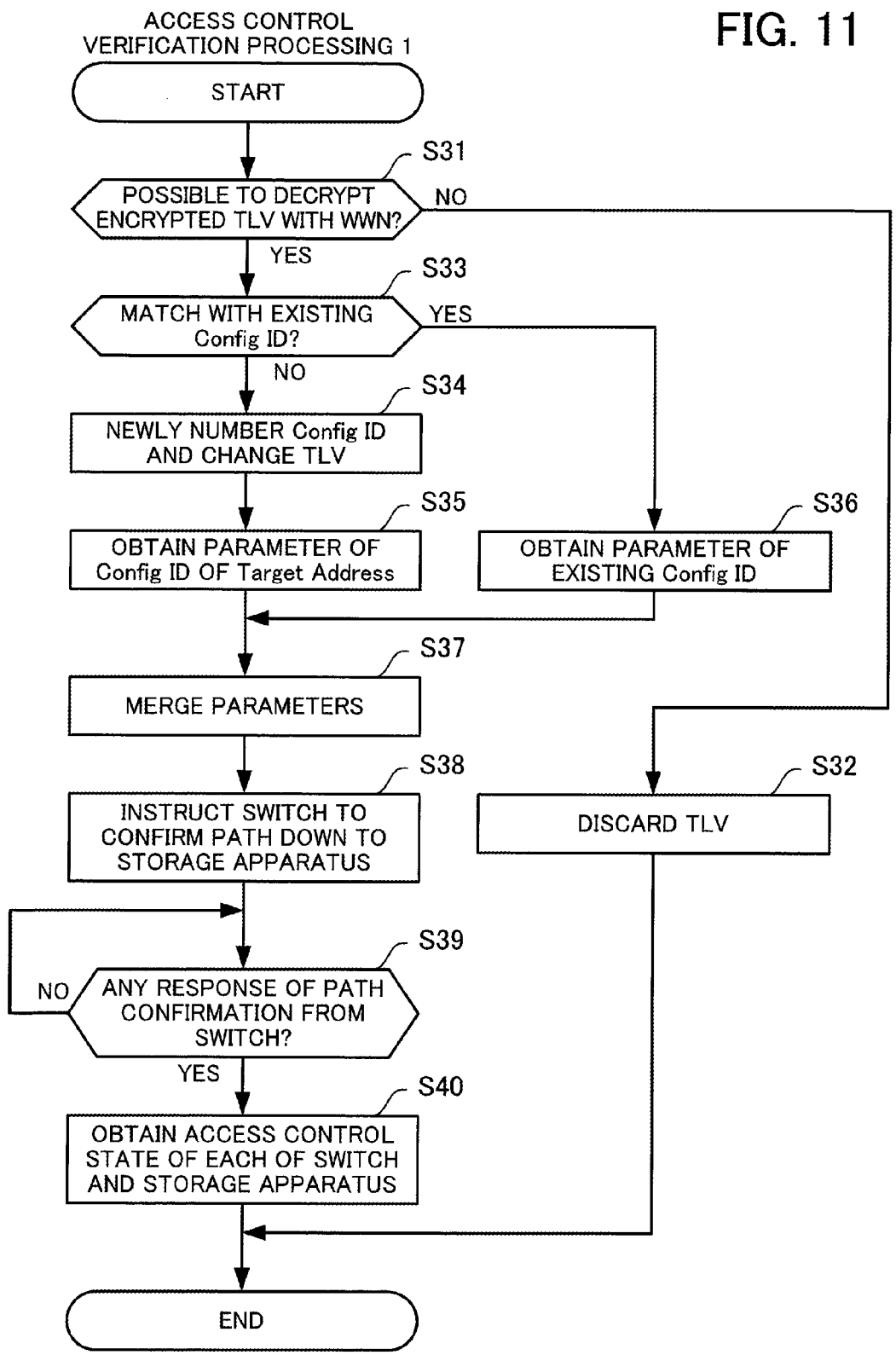
FIG. 11 illustrates a flowchart of access control verification processing 1 of the second embodiment.

Next, access control verification processing 1 of the second embodiment is described using FIG. 11. FIG. 11 illustrates a flowchart of the access control verification processing 1 of the second embodiment. The access control verification processing 1 decrypts the encrypted TLV and generates the TLV (final version). The setting information generation unit 201 and access control verification unit 202 of the management server 20 execute the access control verification processing 1 triggered by receipt of the encrypted TLV from the switch 12.

(Step S31) The setting information generation unit 201 determines whether or not it is possible to decrypt the encrypted TLV into the TLV (provisional version), using the WWN of a port of the switch 12 as a decryption key. The setting information generation unit 201 proceeds to step S33 when it is possible to decrypt the encrypted TLV into the TLV (provisional version), and proceeds to step S32 when it is not possible to decrypt the encrypted TLV into the TLV (provisional version).

(Step S32) The setting information generation unit 201 discards the received encrypted TLV, and completes the access control verification processing 1.

(Step S33) The setting information generation unit 201 determines whether or not the item "Config ID" of the TLV (provisional version) matches the existing Config ID. The setting information generation unit 201 proceeds to step S36 when the item "Config ID" of the TLV (provisional version) matches the existing Config ID, and proceeds to step S34 when it does not match.

(Step S34) The setting information generation unit 201 newly numbers the Config ID. The setting information generation unit 201 sets the specified value to the Config ID when the item "Config ID" of the TLV (provisional version) specifies a specific value, and sets any value to the Config ID, when it specifies "Auto".

(Step S35) The setting information generation unit 201 searches for an already set Config ID having a value set to the item "(Config) Target Address", with reference to the item "(Config) Target Address" of the TLV (provisional version). The setting information generation unit 201 searches the Config Profile TLV stored in the setting information storage unit 204. The setting information generation unit 201 obtains a parameter (setting information) of the Config Profile TLV having the Config ID searched for.

(Step S36) The setting information generation unit 201 obtains the parameter (setting information) of the Config Profile TLV having the existing Config ID.

(Step S37) The setting information generation unit 201 merges the parameter of the TLV (provisional version) and the parameter of the Config Profile TLV obtained in step S35 or step S36. The config Profile TLV obtained in step S35 or step S36 has a predetermined correspondence relation with the TLV (provisional version). The predetermined correspondence relation is the matching of the Config ID (identification information) or the matching of the Target Address (communication destination information) between the Config Profile TLV obtained in step S35 or step S36 and the TLV (provisional version).

Note that the merging of parameters is described later using FIG. 12 and FIG. 13. Thus, the setting information generation unit 201 may generate the TLV (final version) obtained by complementing the TLV (provisional version) with the Config Profile TLV stored in the setting information storage unit 204.

(Step S38) The access control verification unit 202 instructs the switch 12 to confirm the communication path down to the storage apparatus 13 (to perform communication confirmation) based on the TLV (final version).

(Step S39) The access control verification unit 202 waits for a response from the switch 12 about the confirmation of the communication path down to the storage apparatus 13 based on the TLV (final version). The access control verification unit 202 proceeds to step S40 when there is a response from the switch 12. The confirmation of the communication path down to the storage apparatus 13 based on the TLV (final version) by the switch 12 is described later using FIG. 14.

(Step S40) The access control verification unit 202 obtains the access control state of the switch 12 and the access control state of the storage apparatus 13, and completes the access control verification processing 1. The access control state is the information about access restriction or access permission. The access control state is, for example, the information such as an ACL (access control list) and Zone of the switch 12, and is the information such as the affinity of the storage apparatus 13.

Here, the merging of parameters performed in step S37 by the setting information generation unit 201 is described. First, the merging of parameters in newly numbering the Config ID is described using FIG. 12. FIG. 12 illustrates an example of the merging of Config Profile TLV of the second embodiment.

Since the Config ID "1000" of the TLV (provisional version) is a new Config ID, the setting information generation unit 201 sets the specific value "1000" specified by the item "Config ID" of the TLV (provisional version) to the Config ID of the TLV (final version). The setting information generation unit 201 searches the Config Profile TLV having the same (Config) Target Address as the (Config) Target Address "ff.ff.ff.ff.ff.ff.ff.ff" of the TLV (provisional version). Thus, the setting information generation unit 201 obtains the parameter of the Config Profile TLV of Config ID "200" as the existing parameter.

The setting information generation unit 201 merges the items each having a specific value set in the TLV (provisional version) according to the rule described later, and sets the existing parameter to the value after the merging with regard to the item having the value "Auto" set in the TLV (provisional version). Thus, the item "(Config) Port Channel" of the TLV (provisional version) becomes the value "No use" in the TLV (final version).

When a specific value is already set to each of the item "(Config) Port Speed" and the item "(Config) MTU" in the TLV (provisional version), the setting information generation unit 201 sets in the TLV (final version) a larger value as compared with the existing parameter. Thus, the item "(Config) Port Speed" of the TLV (provisional version) becomes the value "40G" in the TLV (final version). Moreover, the item "(Config) MTU" of the TLV (provisional version) becomes the value "9018" in the TLV (final version).

When a specific value is already set to the item "(Config) VLAN ID" in the TLV (provisional version), the setting information generation unit 201 sets both the value of the TLV (provisional version) and the existing parameter in the TLV (final version). Thus, the item "(Config) VLAN ID" of the TLV (provisional version) becomes the values "30, 31" in the TLV (final version). Note that, when the item "(Config) VLAN ID" has a plurality of parameters, the setting information generation unit 201 sets a value "Trunk" to the item "(Config) Switch Port". On the other hand, when the item "(Config) VLAN ID" has one parameter, the setting information generation unit 201 sets the value "Access" to the item "(Config) Switch Port".

Note that, when a specific value is already set to the item "(Config) Port Channel" in the TLV (provisional version), the setting information generation unit 201 sets the value of the TLV (provisional version) in the TLV (final version).

Next, the merging of parameters when there is an existing Config ID is described using FIG. 13. FIG. 13 illustrates an example of the merging of Config Profile TLV's of the second embodiment.

Since the Config ID "100" of the TLV (provisional version) is the existing Config ID, the setting information generation unit 201 sets the specific value "100" specified by the item "Config ID" of the TLV (provisional version) to the Config ID of the TLV (final version).

Thus, the item "(Config) Port Channel" of the TLV (provisional version) becomes the value "5" in the TLV (final version). The item "(Config) Port Speed" of the TLV (provisional version) becomes the value "10G" in the TLV (final version). The item "(Config) MTU" of the TLV (provisional version) becomes the value "9018" in the TLV (final version). The item "(Config) VLAN ID" of the TLV (provisional version) becomes the value "21" in the TLV (final version). The item "(Config) Switch Port" becomes the value "Access" in the TLV (final version).

In this manner, the setting information generation unit 201 generates the TLV (final version) according to a generation rule set in advance for each item. Accordingly, the storage system 10 may generate an appropriate TLV (final version) from the TLV (provisional version).

Figure 14:
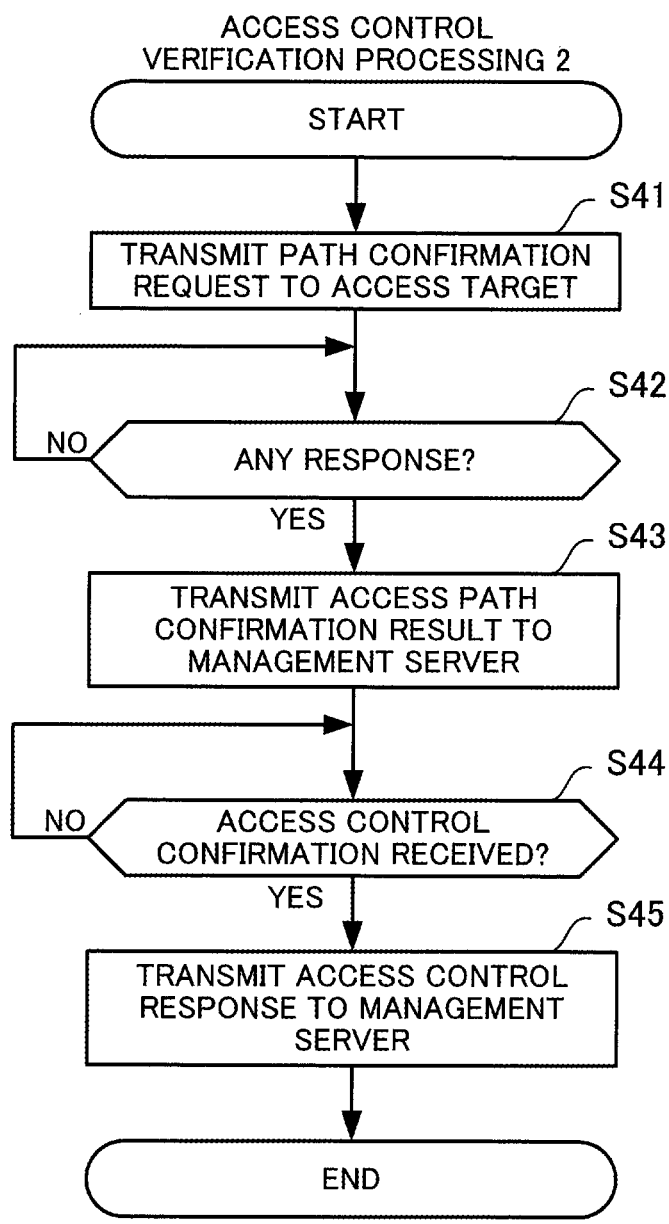
FIG. 14 illustrates a flowchart of access control verification processing 2 of the second embodiment.

Next, access control verification processing 2 of the second embodiment is described using FIG. 14. FIG. 14 illustrates a flowchart of the access control verification processing 2 of the second embodiment. The access control verification processing 2 verifies the path from the switch 12 to the storage apparatus 13 and the access control state of the switch 12. The access control verification unit 122 of the switch 12 executes the access control verification processing 2 triggered by receipt of the communication confirmation instruction from the management server 20.

(Step S41) The access control verification unit 122 requests an access target, i.e., the storage apparatus 13, for path confirmation.

(Step S42) The access control verification unit 122 determines whether or not there is a response from the access target, i.e., the storage apparatus 13. When there is a response from the access target, the access control verification unit 122 proceeds to step S43 by regarding the access path confirmation as successful, and waits for a response when there is no response from the access target. Note that, when determining that time out or retry out occurs, the access control verification unit 122 proceeds to step S43 by regarding the access path confirmation as unsuccessful.

(Step S43) The access control verification unit 122 transmits the access path confirmation result to the management server 20.

(Step S44) The access control verification unit 122 determines whether or not it has received the access control confirmation from the management server 20. The access control verification unit 122 proceeds to step S45 when it has received an access control confirmation from the management server 20, and waits for receipt of the access control confirmation when it has not received the access control confirmation from the management server 20. Note that, when time out occurs, the access control verification unit 122 completes the access control verification processing 2.

(Step S45) The access control verification unit 122 transmits the content of the access control of the switch 12 to the management server 20 as a response to the access control confirmation, and completes the access control verification processing 2.

Figure 15:
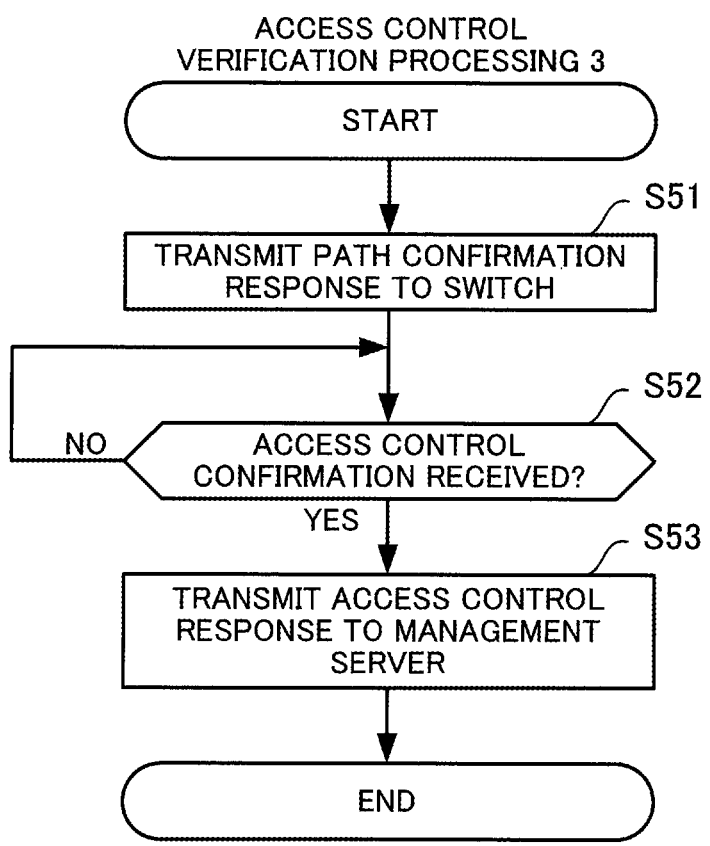
FIG. 15 illustrates a flowchart of access control verification processing 3 of the second embodiment.

Next, access control verification processing 3 of the second embodiment is described using FIG. 15. FIG. 15 illustrates a flowchart of the access control verification processing 3 of the second embodiment. The access control verification processing 3 verifies the path from the switch 12 to the storage apparatus 13 and the access control state of the storage apparatus 13. The access control verification unit 131 of the storage apparatus 13 executes the access control verification processing 3 triggered by receipt of a path confirmation request from the switch 12.

(Step S51) The access control verification unit 131 transmits to the switch 12 a path response to the path confirmation request.

(Step S52) The access control verification unit 131 determines whether or not it has received the access control confirmation from the management server 20. The access control verification unit 131 proceeds to step S53 when the it has received the access control confirmation from the management server 20, it proceeds to step S53, and waits for receipt of the access control confirmation when it has not received the access control confirmation from the management server 20. Note that, when time out occurs, the access control verification unit 131 completes the access control verification processing 3.

(Step S53) The access control verification unit 131 transmits the content of the access control of the storage apparatus 13 to the management server 20 as a response to the access control confirmation, and completes the access control verification processing 3.

Figure 16:
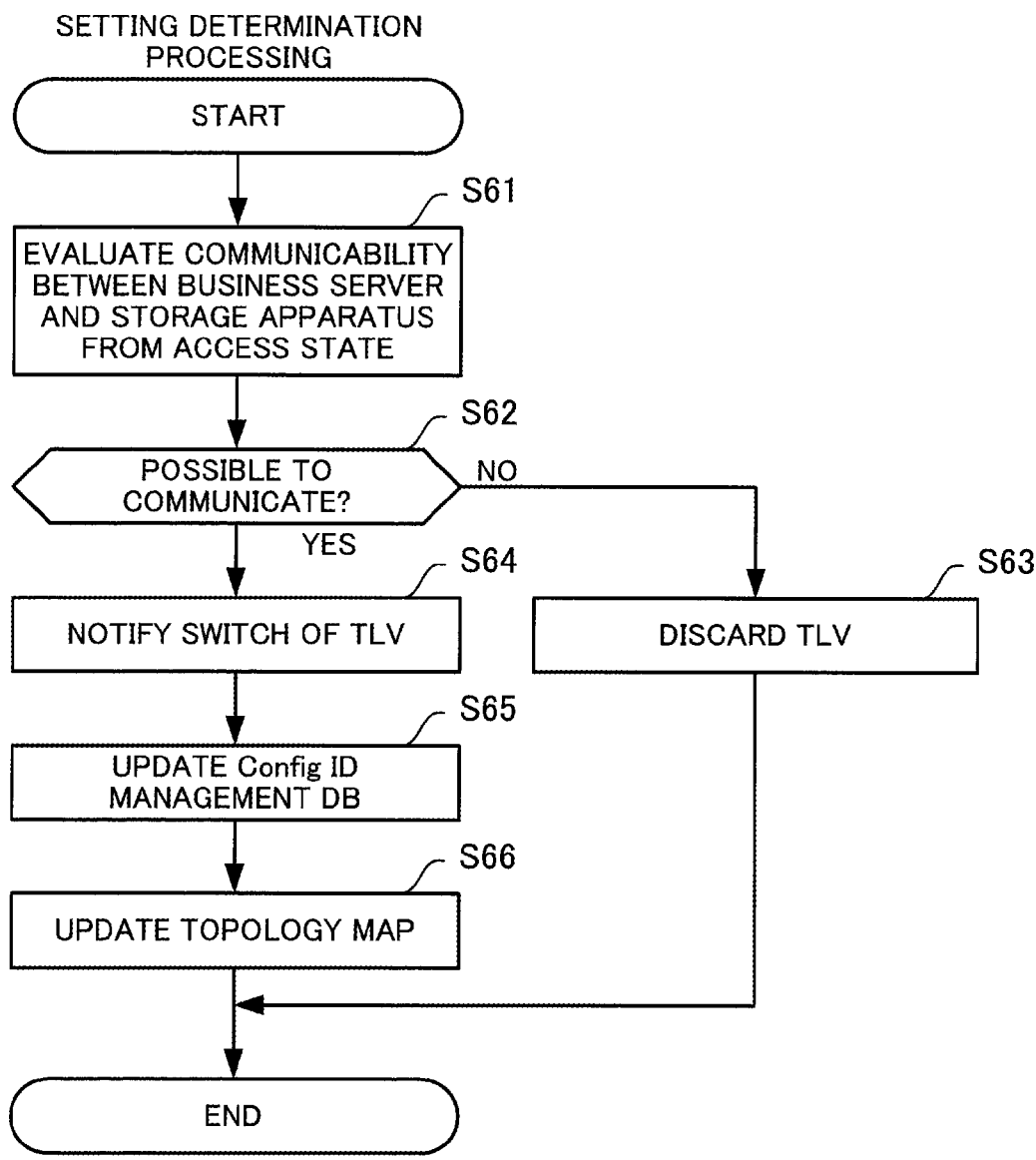
FIG. 16 illustrates a flowchart of setting determination processing of the second embodiment.

Next, setting determination processing of the second embodiment is described using FIG. 16. FIG. 16 illustrates a flowchart of the setting determination processing of the second embodiment. The setting determination processing confirms the matching between the access control of the business server 11 and the access control of the storage apparatus 13, and updates the setting. The setting determination unit 203 of the management server 20 executes the setting determination processing triggered by completion of the access control verification processing 1.

(Step S61) The setting determination unit 203 evaluates the communicability between the business server 11 and the storage apparatus 13 from the access control state obtained by the access control verification unit 202.

(Step S62) The setting determination unit 203 proceeds to step S64 when the business server 11 and the storage apparatus 13 are able to communicate with each other, and proceeds to step S63 when they are not able to communicate with each other.

(Step S63) The setting determination unit 203 discards the TLV (final version), and completes the setting determination processing.

(Step S64) The setting determination unit 203 notifies the switch 12 of the TLV (final version).

(Step S65) The setting determination unit 203 stores the TLV (final version) in the setting information storage unit 204, and updates the Config ID management DB.

(Step S66) The setting determination unit 203 updates a topology map of the business network 15 in accordance with the TLV (final version), and completes the setting determination processing. The topology map is stored in the setting information storage unit 204.

In this manner, the management server 20 updates and manages the setting content and topology map of the business network 15.

Figure 17:
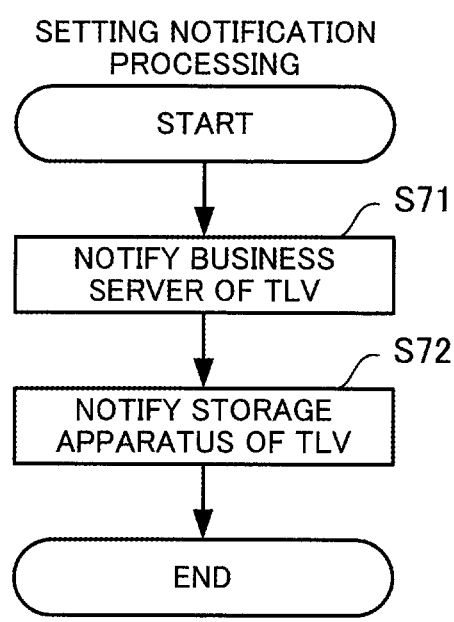
FIG. 17 illustrates a flowchart of setting notification processing of the second embodiment.

Next, setting notification processing of the second embodiment is described using FIG. 17. FIG. 17 illustrates the flowchart of the setting notification processing of the second embodiment. The setting notification processing notifies the business server 11 and storage apparatus 13 of the TLV (final version) notified of from the management server 20. The setting notification unit 123 of the switch 12 executes the setting notification processing triggered by receipt of the TLV (final version) from the management server 20.

(Step S71) The setting notification unit 123 notifies the business server 11 of the TLV (final version).

(Step S72) The setting notification unit 123 notifies the storage apparatus 13 of the TLV (final version), and completes the setting notification processing.

Figure 18:
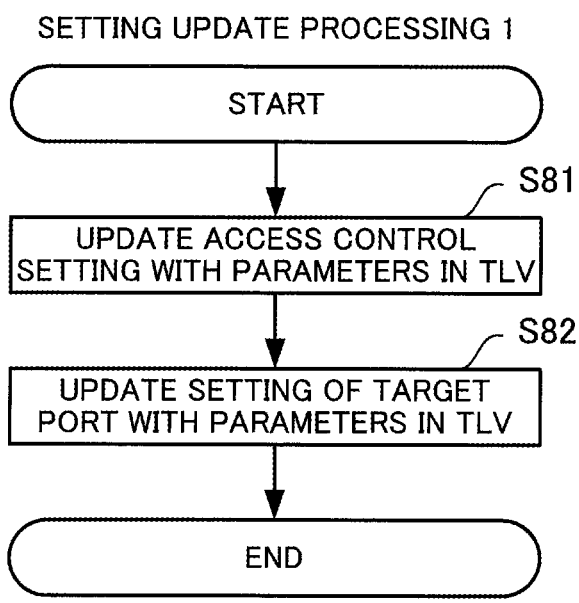
FIG. 18 illustrates a flowchart of setting update processing 1 of the second embodiment.

Next, setting update processing 1 of the second embodiment is described using FIG. 18. FIG. 18 illustrates the flowchart of the setting update processing 1 of the second embodiment. The setting update processing 1 updates the setting of the switch 12 in accordance with the TLV (final version) notified of from the management server 20. The setting update unit 124 of the switch 12 executes the setting update processing 1 triggered by completion of the setting notification processing.

(Step S81) The setting update unit 124 updates the access control setting of the switch 12 with the parameters in the TLV (final version).

(Step S82) The setting update unit 124 updates the setting of a target port of the switch 12 with the parameters in the TLV (final version), and completes the setting update processing 1.

In this manner, the setting content of the switch 12 is updated to the setting content according to the TLV (final version).

Figure 19:
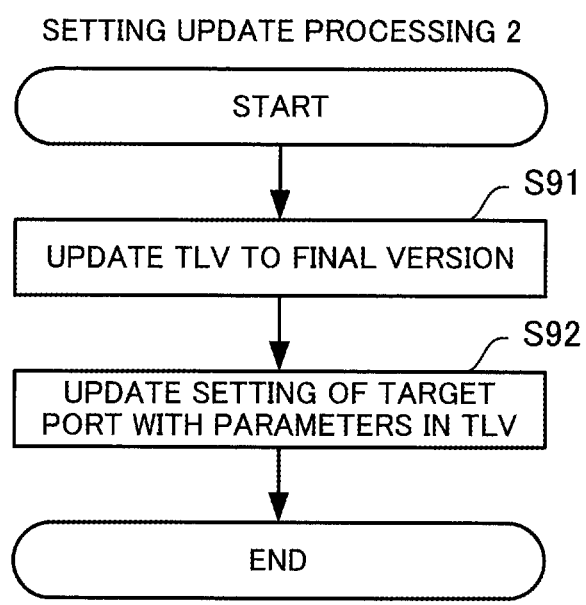
FIG. 19 illustrates a flowchart of setting update processing 2 of the second embodiment.

Next, setting update processing 2 of the second embodiment is described using FIG. 19. FIG. 19 illustrates the flowchart of the setting update processing 2 of the second embodiment. The setting update processing 2 updates the setting of the business server in accordance with the TLV (final version) notified from the switch 12. The setting update unit 112 of the business server 11 executes the setting update processing triggered by receipt of the TLV (final version) from the switch 12.

(Step S91) The setting update unit 112 updates the setting of the business server 11 with parameters in the TLV (final version).

(Step S92) The setting update unit 112 updates the setting of a target port of the business server 11 with parameters in the TLV (final version), and completes the setting update processing 2.

In this manner, the setting content of the business server 11 is updated to the setting content according to the TLV (final version).

Note that, the setting update processing 3 executed by the setting update unit 132 of the storage apparatus 13 is the same as the setting update processing 2 executed by the setting update unit 112 of the business server 11, and therefore the description thereof is omitted. Thus, the setting content of the storage apparatus 13 is updated to the setting content according to the TLV (final version) as with the business server 11.

In this manner, the storage system 10 may complement the parameters in the TLV (provisional version) of the business server 11 serving as the starting point of changing the setting, and further reflect the TLV (final version), with which the access path is confirmed and the access control is confirmed, on the setting of a target apparatus. Accordingly, the storage system 10 may reduce the cost of constructing a communicable state, in constructing the storage system 10 or in changing the configuration of the storage system 10.

Figure 20:
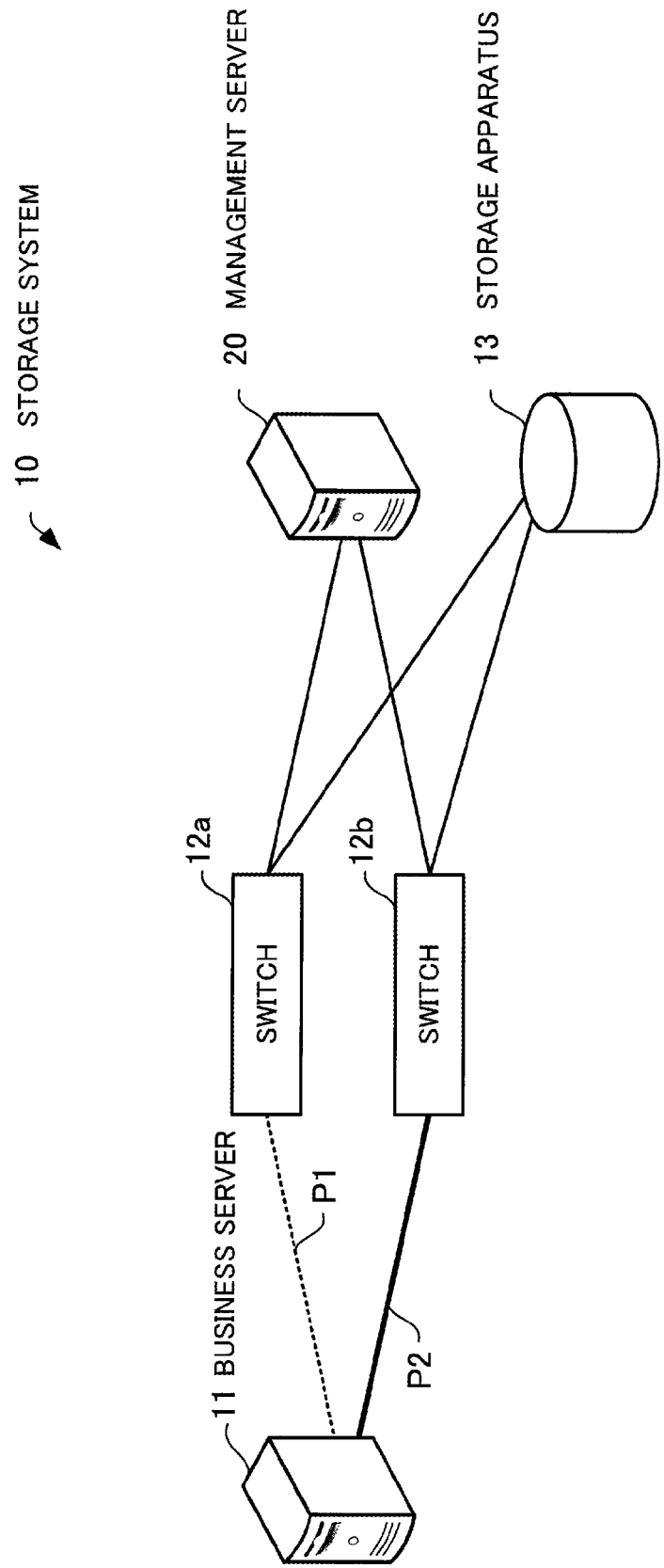
FIG. 20 illustrates an example of changing the configuration of the storage system of the second embodiment.

Next, an example of changing the configuration of the storage system of the second embodiment is described using FIG. 20. FIG. 20 illustrates an example of changing the configuration of the storage system of the second embodiment.

The storage system 10 illustrated in FIG. 20 includes the business server 11, switches 12a and 12b, the storage apparatus 13, and the management server 20. FIG. 20 illustrates a configuration change from a state where the business server 11 is connected to the switch 12a through a path P1 to a state where the business server 11 is connected to the switch 12b through a path P2.

In such a configuration change, the business server 11 may generate the TLV (provisional version) based on the TLV when it is connected to the storage apparatus 13 via the switch 12a. For example, if the TLV when the business server 11 is connected to the storage apparatus 13 via the switch 12a is Config ID "100", the business server 11 may set the Config ID of the TLV (provisional version) to "100".

Moreover, even if the business server 11 does not set the existing Config ID, the management server 20 searches the existing TLV, with the item "(Config) Target Address" as a key.

Then, the TLV (provisional version) is revised to the second version from the first version by the switch 12b, and is complemented with the existing TLV by the management server 20. Thus, the storage system 10 may reduce the burden of inputting the setting on an administrator in changing the setting. Moreover, the storage system 10 may eliminate an error in inputting the setting made by an administrator, and reduce the cost of investigating the cause of the error in inputting the setting made by an administrator.

Accordingly, the storage system 10 may reduce the cost of constructing a communicable state, in constructing the storage system 10 or in changing the configuration of the storage system 10.

Note that the above-described processing functions may be implemented on a computer. In that case, the above-described functions of the first communication apparatus 2, the second communication apparatus 3, the relay apparatus 4, the management apparatus 5, the business server 11, the switch 12, the storage apparatus 13, and the management server 20 are encoded and provided in the form of computer programs. A computer system executes those programs, thereby providing the above-described processing functions. The programs may be stored in computer-readable media. Such computer-readable media include magnetic storage apparatuses, optical discs, magneto-optical storage media, semiconductor memory devices, and other non-transitory storage media. The examples of the magnetic storage include a hard disc drive unit (HDD), a flexible disc (FD), and a magnetic tape. The examples of the optical disc include a DVD, a DVD-RAM, a CD-ROM/RW, and the like. The examples of the magneto-optical storage medium include an MO (Magneto-Optical disk).

For the purpose of distributing computer programs, an optical disc or other portable storage medium containing the programs such as DVD and CD-ROM is made available for sale. Moreover, network-based distribution of software programs may also be possible, in which case program files are stored in a storage apparatus of a server computer for downloading to other computers via a network.

A computer installs programs in its local storage apparatus, from a portable storage medium or a server computer, so that they may be executed. The computer executes the installed programs while reading them out of its local storage apparatus, thereby performing the programmed functions. Where appropriate, the computer may execute programs immediately from a portable storage medium, without installation. Another alternative method is that the computer executes programs as they are downloaded from a server computer connected via a network.

Moreover, at least a part of the above-described processing functions may be implemented on an electronic circuit, such as a DSP, an ASIC, or a PLD.

According to an aspect of the embodiments disclosed herein, in the communication system, the management apparatus, and the communication setting method, the cost of constructing a communicable state in constructing the communication system or in changing the configuration of the communication system may be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication system comprising:
a first communication apparatus connected to a first subnetwork;
a second communication apparatus connected to a second subnetwork;
a relay apparatus placed between the first subnetwork and the second subnetwork; and
a management apparatus which manages a setting of the relay apparatus,
the first communication apparatus includes a first processor configured to perform a procedure including:
notifying the management apparatus via the relay apparatus of first setting information including a part of a first communication setting of the first communication apparatus; and
updating the first communication setting with third setting information received from the management apparatus,
the management apparatus includes a memory and a second processor coupled to the memory, the second processor configured to perform a procedure including:
generating the third setting information from the first setting information and second setting information stored in the memory;
confirming communication based on the third setting information between the first communication apparatus and the second communication apparatus; and
sending, upon confirmation of the communication between the first communication apparatus and the second communication apparatus, the third setting information to the relay apparatus, as well as to the first and second communication apparatuses via the relay apparatus,
wherein the relay apparatus includes a third processor configured to perform a third procedure including updating communication setting of the relay apparatus with the third setting information received from the management apparatus, and
wherein the second communication apparatus includes a fourth processor configured to perform a fourth procedure including updating communication setting of the second communication apparatus with the third setting information received from the management apparatus.

2. The communication system according to claim 1, wherein the first setting information is provisional setting information including a part of the first communication setting of the first communication apparatus.

3. The communication system according to claim 1, wherein the second setting information is setting information having a predetermined correspondence relation with the first setting information.

4. The communication system according to claim 3, wherein the predetermined correspondence relation is that identification information included in the first setting information is the same as identification information with which the second setting information is uniquely identified or that communication destination information included in the first setting information is the same as communication destination information included in the second setting information.

5. The communication system according to claim 1, wherein the management apparatus includes an additional memory that additionally stores the third setting information as the second setting information in the memory, after confirmation of the communication based on the third setting information.

6. The communication system according to claim 1, wherein the generating generates the third setting information according to a generation rule set in advance for each setting item of the first setting information.

7. The communication system according to claim 1, wherein the confirming of communication includes:
requesting the relay apparatus to confirm communication based on the third setting information between the relay apparatus and the second communication apparatus, and
confirming communication based on the third setting information between the first communication apparatus and the second communication apparatus, upon receipt of a response from the relay apparatus.

8. The communication system according to claim 7, wherein the confirming of communication includes confirming matching between an access control state of the relay apparatus and an access control state of the second communication apparatus.

9. A management apparatus comprising:
a memory; and
a processor coupled to the memory, the processor being configured to perform a procedure including:
managing a relay apparatus that relays communication between a first subnetwork and a second subnetwork, the relay apparatus being connected to a first communication apparatus via the first subnetwork and to a second communication apparatus via the second subnetwork;
acquiring first setting information including a part of a communication setting of the first communication apparatus, from the first communication apparatus via the relay apparatus;
generating third setting information from the first setting information and second setting information stored in the memory;
confirming communication based on the third setting information between the first communication apparatus and the second communication apparatus; and
sending, upon confirmation of the communication between the first communication apparatus and the second communication apparatus, the third setting information to the relay apparatus, as well as to the first and second communication apparatuses via the relay apparatus.

10. A communication setting method comprising:
managing, by a management apparatus, a relay apparatus that relays communication between a first subnetwork and a second subnetwork, the relay apparatus being connected to a first communication apparatus via the first subnetwork and to a second communication apparatus via the second subnetwork;
notifying, by the first communication apparatus, the management apparatus via the relay apparatus of first setting information including a part of a first communication setting of the first communication apparatus;
generating, by the management apparatus, third setting information from the first setting information and second setting information stored in memory in the management apparatus;
confirming, by the management apparatus, communication based on the third setting information between the first communication apparatus and the second communication apparatus;
sending, by the management apparatus upon confirmation of the communication between the first communication apparatus and the second communication apparatus, the third setting information to the relay apparatus, as well as to the first communication and second apparatuses via the relay apparatus;

updating, by the first communication apparatus, the first communication setting with the third setting information received from the management apparatus;

updating, by the second communication apparatus, a second communication setting with the third setting information received from the management apparatus; and updating, by the relay apparatus, a third communication setting with the third setting information received from the management apparatus.

\* \* \* \* \*